April 24, 1962 V. L. SMITHERS 3,031,018
PORTABLE POWER-DRIVEN IMPLEMENT
Filed Nov. 19, 1959 4 Sheets-Sheet 1
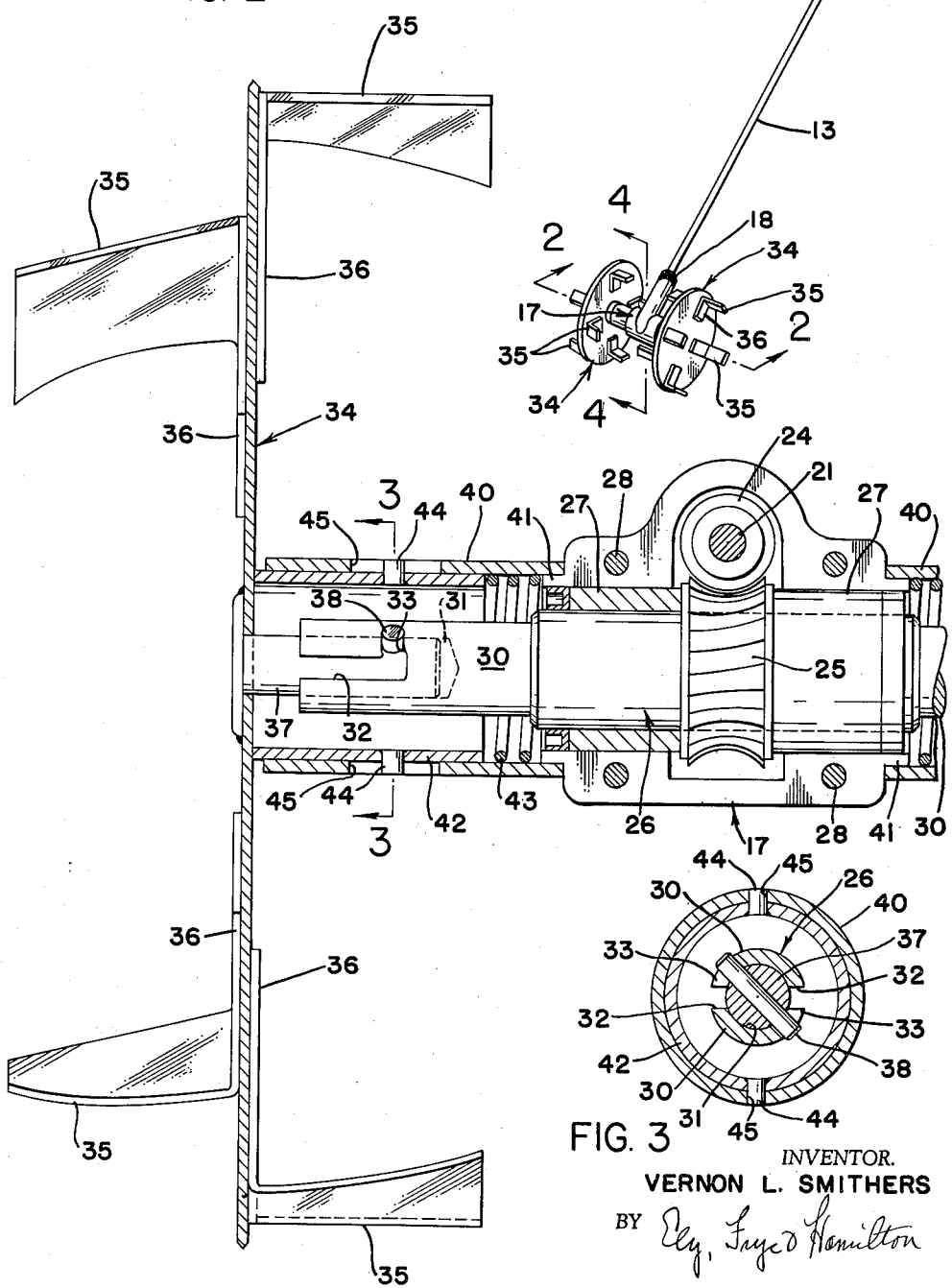
INVENTOR.
VERNON L. SMITHERS
BY
ATTORNEYS April 24, 1962 V. L. SMITHERS 3,031,018
PORTABLE POWER-DRIVEN IMPLEMENT
Filed Nov. 19, 1959 4 Sheets-Sheet 2
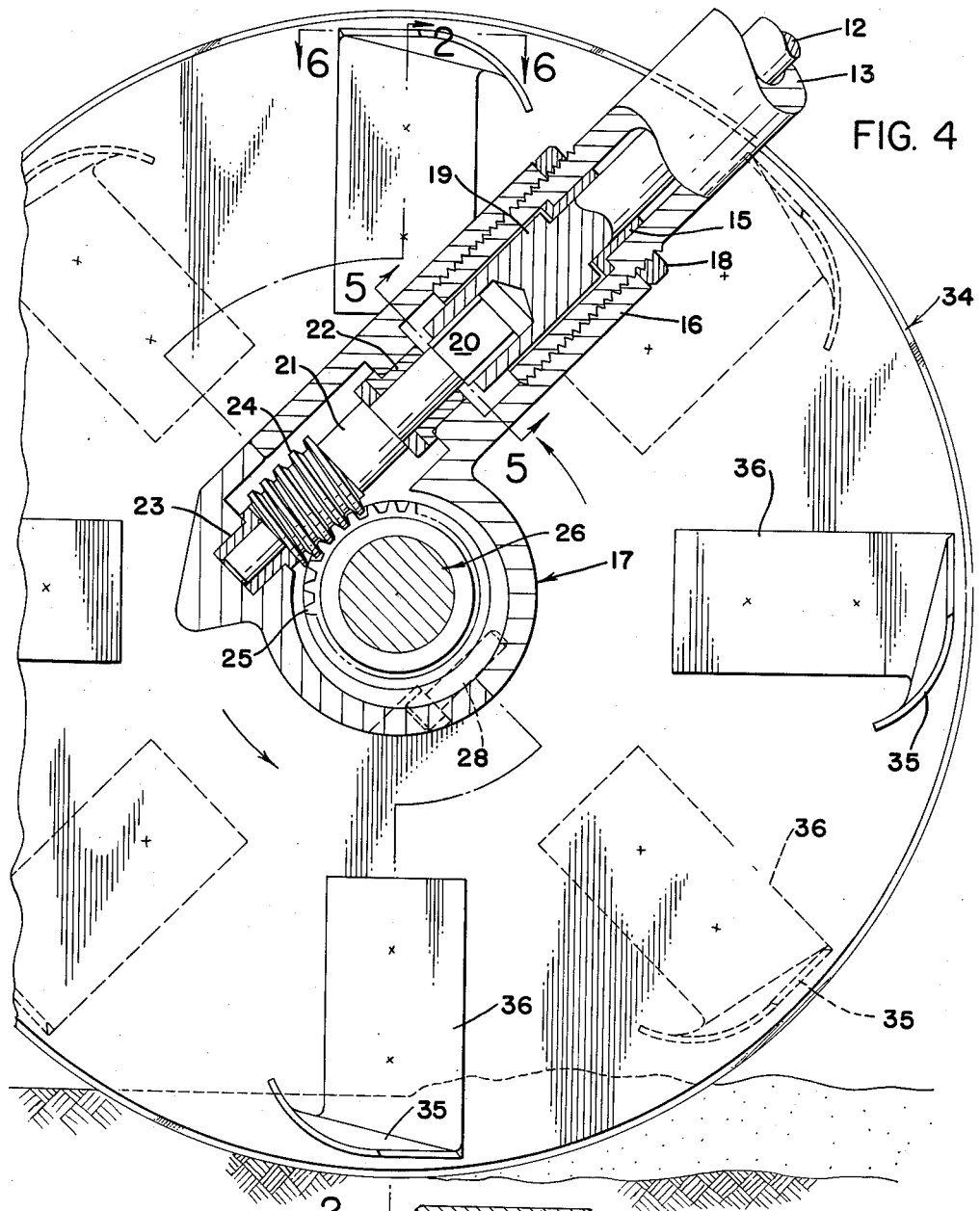
FIG. 4
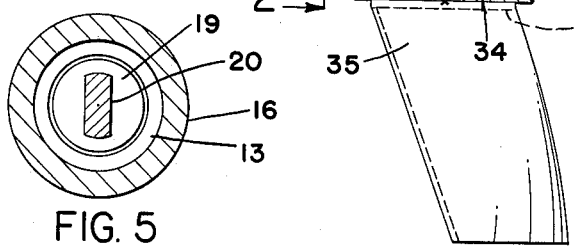
FIG. 5
FIG. 6
INVENTOR.
VERNON L. SMITHERS
BY *Ely, Frye & Hamilton*
ATTORNEYS April 24, 1962  V. L. SMITHERS  3,031,018
PORTABLE POWER-DRIVEN IMPLEMENT
Filed Nov. 19, 1959  4 Sheets-Sheet 3

*INVENTOR.*
VERNON L. SMITHERS
BY Ely, Frye & Hamilton
ATTORNEYS

April 24, 1962 — V. L. SMITHERS — 3,031,018
PORTABLE POWER-DRIVEN IMPLEMENT
Filed Nov. 19, 1959 — 4 Sheets-Sheet 4
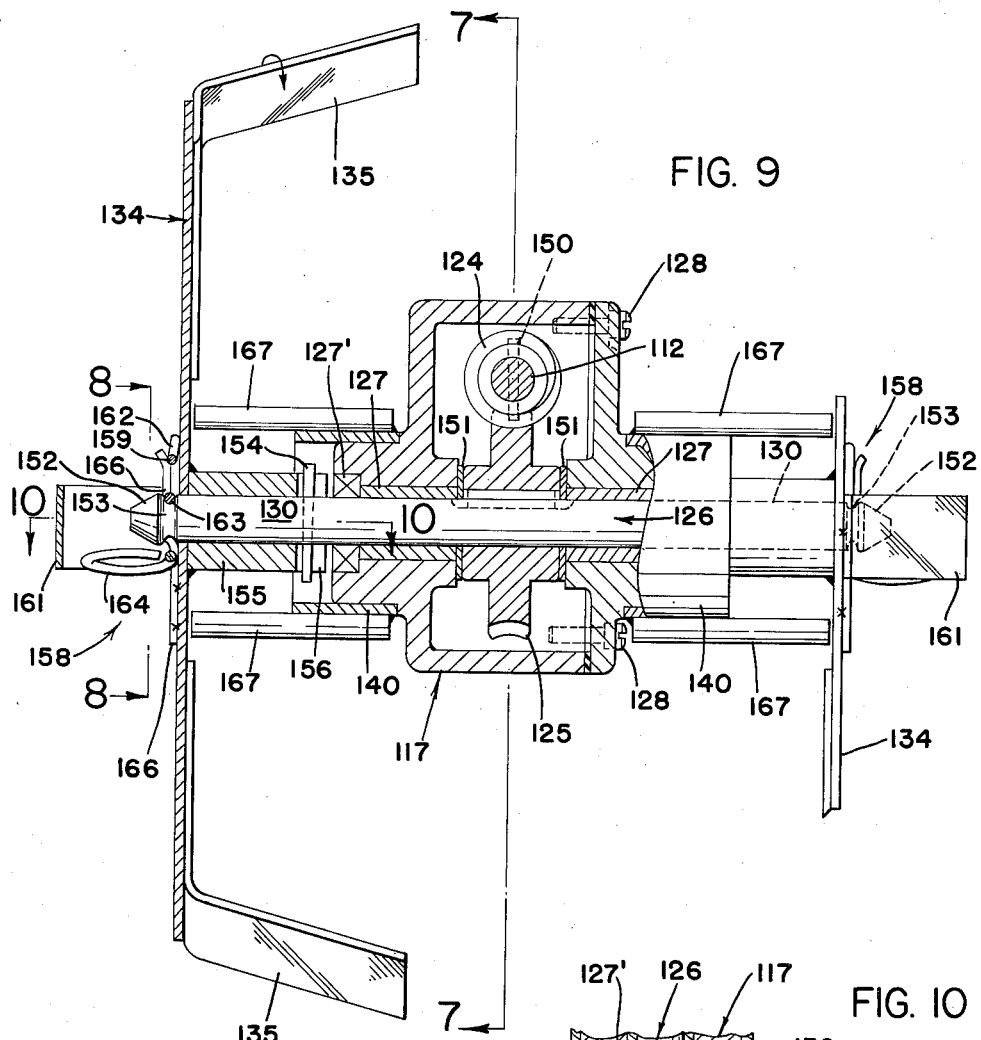
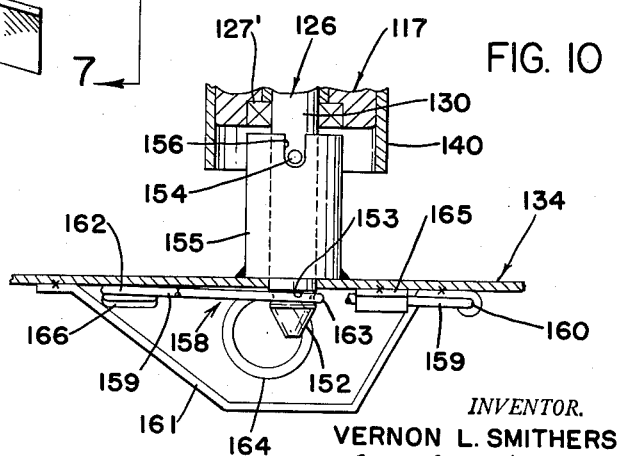
INVENTOR.
VERNON L. SMITHERS
ATTORNEYS

United States Patent Office 3,031,018
Patented Apr. 24, 1962

3,031,018
PORTABLE POWER-DRIVEN IMPLEMENT
Vernon L. Smithers, Akron, Ohio, assignor to The V. L. Smithers Manufacturing Company, Kent, Ohio, a corporation of Ohio
Filed Nov. 19, 1959, Ser. No. 854,167
3 Claims. (Cl. 172—41)

The invention relates generally to portable power-driven hand tools or implements for various purposes, and more-particularly to a portable power-driven gardening tool especially adapted for cultivating, furrowing, tilling, or otherwise working the soil.

Conventional gardening or soil working power tools are usually heavy, expensive and awkward to manipulate. Such tools are particularly adapted for certain tasks, and sometimes have attachments to perform other related tasks, but substantial time and skill is required, as well as the use of various tools such as wrenches, pliers and screw drivers, to change attachments.

The weight and unwieldiness of such conventional power tools and the inconvenience of changing attachments limits their use to men having the requisite strength and skill. Even so, changing attachments is a time-consuming operation requiring the operator to have the necessary hand wrenches or other tools with him wherever the changes are made.

The objects of the present invention include the provision of a novel, inexpensive, power-driven hand tool which is lightweight, balanced and easily manipulated by a man, woman or boy with ordinary skill, and which is adapted for quick change of attachments without requiring any tools or any special skill.

More specifically, it is an object to provide an improved power-driven hand implement having a driving head to which a variety of attachments are easily fastened by mere manipulation with the fingers.

Another object is to provide a power-driven hand tool having a driven shaft for rotating a variety of attachments, said tool having novel means for substantially preventing weeds, grass, vines and the like from wrapping tightly around the shaft.

A further object is to provide an improved power-driven hand tool having a driven shaft adapted for quick attachment to a variety of implements, said shaft and attachments having cooperating detachable connection means for quickly removing any grass or weeds which may accumulate around the shaft.

These and other objects are accomplished by the parts, improvements, combinations and arrangements comprising the present invention, preferred embodiments of which are shown by way of example in the accompanying drawings and described in detail herein. Various modifications and changes in details of construction are comprehended within the scope of the invention defined in the appended claims.

The improved power-driven implement preferably comprises an electric motor mounted at the upper end of a transmission drive shaft carrying a head at its lower end mounting a transverse driven shaft, the ends of which are accessible for attachment to various implements, the shaft ends and the implements having cooperating detachable connection means manipulatable by the fingers, and guard means on the head protecting the shaft ends.

Referring to the drawings:

FIG. 1 is a perspective view of a preferred embodiment of the improved power-driven hand tool comprising the invention.

FIG. 2 is an enlarged fragmentary sectional view, as on line 2—2 of FIGS. 1 and 4, of one embodiment of the head with a soil tilling implement detachably connected thereto.

FIG. 3 is a fragmentary cross sectional view on line 3—3 of FIG. 2.

FIG. 4 is an enlarged fragmentary sectional view as on line 4—4 of FIG. 1.

FIG. 5 is a fragmentary section on line 5—5 of FIG. 4.

FIG. 6 is a fragmentary elevation on line 6—6 of FIG. 4.

FIG. 9 is a sectional view similar to FIG. 2 of the embodiment of FIG. 7, taken on line 9—9 of FIG. 7.

FIG. 10 is a fragmentary sectional view on line 10—10 of FIG. 9.

Figure 7:
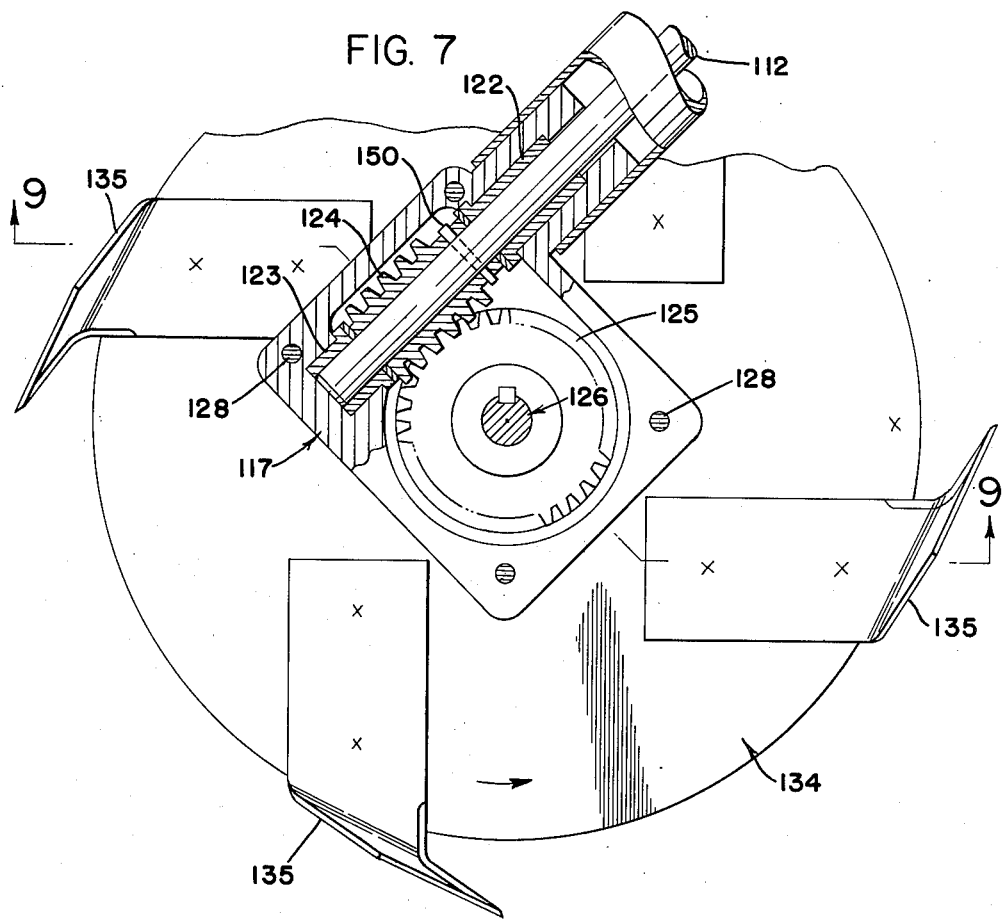
FIG. 7 is a view similar to FIG. 4 of another embodiment of head and tiller implement detachably connected thereto taken on line 7—7 of FIG. 9.

Referring first to FIGS. 1–6, an electric motor 11 of suitable design and capacity is operatively connected to the upper end of a power-transmitting drive shaft 12 which is journaled in a shaft housing 13 normally carried in an upwardly inclined position as shown in FIG. 1. The motor is provided with a suitable carrying handle 14 so that the weight of the motor is supported directly below the handle. The motor may be connected with any suitable electric power source, as for example a portable generator unit.

The transmission shaft 12 is preferably journaled in a sleeve bearing 15 in the lower end of shaft housing 13, and in a similar bearing (not shown) in the upper end of the housing. Preferably, the lower end of the shaft housing 13 is screwed into a neck 16 on the head 17 and secured by a hand lock nut 18. The lower end of shaft 12 may have a socket portion 19 receiving a splined connection 20 on the end of a worm shaft 21. This construction allows disconnecting the shaft 12 and housing 13 from the head. If desired, the shaft 12 may be detachably connected at its upper end to the motor 11, by any suitable coupling means.

The worm shaft 21 is journaled in the head in bearings 22 and 23, and the worm 24 meshes with a worm gear 25 secured on a transverse driven shaft 26 journaled in the head in bearings 27. Preferably, the head is separable into two mating parts clamped together by screw studs 28. The shaft 26 has reduced diameter extensions 30 at each end of the head, and the extensions are counterbored to provide sockets 31 therein. Bayonet slots 32 having angular end portions 33 are provided in the wall of each socket.

The soil tilling implements detachably mounted on the shaft ends 30 preferably comprise disks 34 having cultivator or soil-working blades 35 extending outwardly from opposite faces of the disks. A plurality of the blades 35, four being shown, is mounted on each face of each disk at circumferentially spaced intervals. Each blade may have a flange 36 attached to the disk, as by spot welding, and preferably the blades on one face are staggered with respect to the blades on the other face, as indicated in FIG. 4. As shown in FIGS. 2, 4 and 6, the blades 35 are preferably contoured to facilitate the soil-working operation.

The disks 34 have hub shafts 37 extending from one face and adapted to fit slidably in the sockets 31 of shaft extensions 30. Each hub shaft has a pin 38 projecting laterally therefrom adapted to slide inwardly in slots 32 and laterally into the angular end portions 33 thereof to provide a bayonet lock between the disk and the shaft extension 30. A sleeve guard 40 is provided around each shaft extension 30, and the inner ends of the sleeves are secured on shoulders 41 on the head 17. Inner sleeves 42 are slidable in the sleeve guards 40, and springs 43, interposed between the shoulders 41 and the inner ends of sleeves 42, urge the outer ends of sleeves 42 into slidable abutment with the disks 34 to yieldingly hold the pins 38 locked in the angular portions 33 of the bayonet slots 32. Pins 44 in the sleeves 42 are slidable in longitudinal slots 45 in sleeves 40 to retain the sleeves 42 when the pins 38 are unlocked and withdrawn from slots 32.

As viewed in FIG. 4, the disks are rotated counterclockwise, and the leading edges of the blades 35 may be beveled rearwardly. In operation, the operator holds the handle 14 with the shaft at an angle such as shown in FIG. 1 as he walks slowly along a row or furrow to be cultivated or worked. The weight of the tool cooperates with the rotation of the disks to cause the blades to penetrate and work the soil, as indicated in FIG. 4. By mounting the motor 11 with its handle 14 at the upper end of the shaft 12, its weight is carried by the arm extending vertically down from the shoulder, thus avoiding the tiresome effort required to lift and control a heavy weight at the lower end of the shaft.

The disks 34 are quickly attached or detached from the head at any time merely by pushing the disk against the spring 43 and twisting it to move the pin 38 into or out of the slots 33. No tools whatever nor any special skills are required. Other attachments for working or weeding the soil may be provided with similar hub shafts 37 and pins 38, and are just as quickly attached and detached in the same manner.

The sleeve guards 40 fully protect the rotating shafts 37 and 30 and prevent weeds, grass and vines from wrapping tightly around the same, while any accumulation of dirt, grass and the like around the sleeves 40 and 42 adjacent the disks is quickly removed by detaching the disk and its hub shaft 37 from the shaft 30.

Referring to the embodiment of the invention shown in FIGS. 7–10, the power-transmitting drive shaft 112 from the electric motor is journaled in bearings 122 and 123 in the head 117. The worm 124 is shown secured directly on the shaft 112 by a pin 150, but if desired the worm shaft may be separate and splined to the transmission shaft as in FIG. 4. The worm 124 meshes with a worm gear 125 secured on a transverse driven shaft 126 journaled in bearings 127 and anti-friction bearings 127' in the head. Preferably, the head is separable along a transverse plane at one side of the worm gear into two parts clamped together with screws 128, and thrust washers 151 are interposed between the worm gear 125 and the housing.

The shaft 126 has extended portions 130 at both ends of the head 117, and each end of the shaft has a preferably tapered head 152 adjacent which is an annular groove 153. Adjacent to the head 117 each shaft extension 130 has a transverse drive pin 154 projecting from opposite sides thereof. All attachments for the embodiment of FIGS. 7–10 have a hub construction such as shown in the soil tilling disks 134 for quick attachment to and detachment from shaft 126.

The hub on each disk 134 preferably has a hollow shaft 155 welded to and extending from the inner face of the disk, the bore of the shaft 155 registering with a center hole in the disk. The diameter of the bore and registering hole is such as to fit slidably over a shaft extension 130, and the inner end of the shaft 155 is slotted at 156 to receive the drive pin 154.

The disks 134 have flanged blades 135 spot welded thereto at circumferential intervals, and as shown in FIG. 9, the blades may extend from the inside only of the disks for certain operations such as cultivating close to a row of plants. Obviously, the disks 134 may have blades extending from both sides as in the embodiment of FIGS. 1–6. The blades 135 of FIGS. 7–10 are shown flat rather than contoured and as extending at an obtuse angle beyond the periphery of the disk. The particular design of the blades varies according to the task to be performed and per se forms no part of the present invention.

Figure 8:
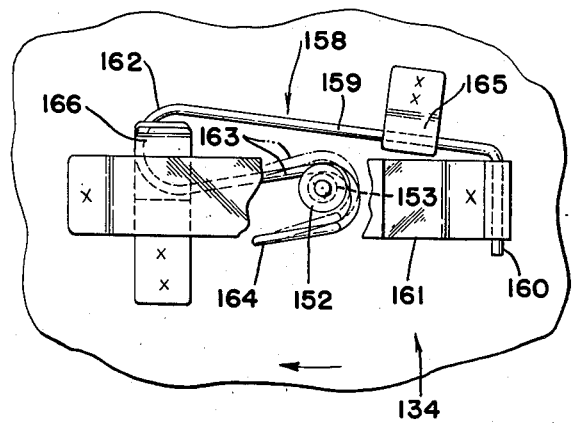
FIG. 8 is an enlarged fragmentary elevation as on line 8—8 of FIG. 9, showing the detachable connection between the implement and shaft.

The novel means for detachably holding the disks 134 on the shafts 130 comprises a spring wire latch on the outer face of each disk, indicated as a whole at 158, for resiliently engaging the annular groove 153 on the end of one of the shaft extensions 130. As best shown in FIG. 8, the latch 158 has an intermediate straight portion 159 terminating in an angular leg 160 at one end secured to one end of a guard bracket 161 which overlies the head 152 of the shaft and is spot welded at its ends to the outer face of the disk. The other end of the straight portion 159 connects with a loop 162 which is in turn connected to a reverse loop 163, and the reverse loop terminates in an angularly disposed coiled or circular finger piece 164. The straight portion 159 is secured to the disk by a clip 165, and the loop 162 is secured to the disk by a clip 166, both clips being spot welded at one end to the disk.

As shown in full lines in FIG. 8, the reverse loop 163 normally resiliently engages in the groove 153 behind head 152, but by pressing on the finger piece 164 with the thumb or finger the loop is moved to the chain line position to release the shaft, so that the disk can be slid outwardly over the head to remove it from the shaft. To attach the disk, the sleeve 155 is slid over the head until the tapered head engages the loop 163 and "cams" it into the groove 153.

Sleeve guards 140 are secured to bosses on the head 117 and encircle the drive pins 154. If desired, these guards could extend to the disks 134 as in the embodiment of FIGS. 1–6. However, in order to reduce the amount of surface frictionally contacting the disks, the guards 140 are shortened and bars 167 are secured thereto at intervals and extend to the inner surface of the adjacent disk. These bars substantially prevent grass, weeds and vines from wrapping tightly around the rotating sleeves 155. As best seen in FIG. 10, the reverse loop 163 is slightly sprung outwardly of the disk to yieldingly maintain a minimum but slight clearance between the disk and the ends of the bars 167 (FIG. 9) to reduce frictional wear on the disk.

The disk 134 and other attachments are quickly attached to or detached from the head 117 without the use of any tools merely by manipulating the latches 158 with the fingers.

Both embodiments of the invention are lightweight, easily portable, nicely balanced and operable by any person without special skill. No tools are required for operating or for interchanging a variety of attachments, which may include implements for performing tasks other than gardening, such as moving snow, sweeping, trimming grass or hedges, etc.

What is claimed is:

1. A power-driven implement adapted for working the soil comprising a power-transmitting drive shaft adapted to be carried in an upwardly inclined position, a motor operatively connected to the upper end of said shaft and having a handle, a head mounted on the lower end of said shaft, a transverse driven shaft in the head operatively connected to said drive shaft and having an outer extension, the end of said extension having an annular groove, an implement disk having a driving connection with said shaft extension, a spring wire latch on said disk normally engaged in said groove releasable by the fingers, and guard means non-rotatably mounted on said head extending over said shaft extension to substantially prevent weeds and the like from wrapping on the shaft, said latch yieldingly holding said disk in substantial contact with said guard means.

2. In a power-driven implement having a head and a driven shaft operatively mounted in said head, said shaft having an annular groove at its outer end, an implement disk having a driving connection with said shaft extension, a spring wire latch on said disk normally engaged in said groove releasable by pressing thereon with the fingers, and guard means on said head extending over said hub shaft to said disk to substantially prevent weeds and the like from wrapping on the shaft, said latch yieldingly holding said disk in substantial contact with said guard means.

3. In a power-driven implement having a head and a driven shaft operatively mounted in said head, said shaft having an annular groove at its outer end, an implement disk having a hub shaft adapted for driving connection with said shaft extension, a spring wire latch secured to said disk and having a loop normally yieldingly engaging said groove, a finger piece extending angularly from said loop for releasing said loop by finger pressure thereon, and guard means on said head extending over said hub shaft to said disk to substantially prevent weeds and the like from wrapping on the shaft, said latch yieldingly holding said disk in substantial contact with said guard means.

References Cited in the file of this patent
UNITED STATES PATENTS

| | | |
|---|---|---|
| 990,846 | Crandall | May 2, 1911 |
| 2,226,098 | Hedstrom | Apr. 2, 1940 |
| 2,823,597 | Kelsey | Feb. 18, 1958 |
| 2,888,994 | Hoff et al. | June 2, 1959 |
| 2,907,395 | Moe | Oct. 6, 1959 |